United States Patent [19]

McMullen

[11] Patent Number: 4,561,395
[45] Date of Patent: Dec. 31, 1985

[54] AUXILIARY OIL FILTRATION SYSTEM

[76] Inventor: Tod McMullen, 8036 Linda Vista Rd., #2F, San Diego, Calif. 92111

[21] Appl. No.: 624,016

[22] Filed: Jun. 25, 1984

[51] Int. Cl.[4] .............................................. B01D 27/10
[52] U.S. Cl. ................... 123/196 A; 210/168; 184/6.24; 184/6.25
[58] Field of Search ....................... 123/196 A, 196 R; 210/168, 94, 95; 184/6.24, 6.25

[56] References Cited

U.S. PATENT DOCUMENTS 1,926,741  9/1933  Frye et al. ...................... 123/196 A
3,356,216  12/1967  Sato ................................. 210/94
4,452,695  6/1984  Schmidt ....................... 123/196 A Primary Examiner—E. Rollins Cross

[57] ABSTRACT

An auxiliary or secondary filtration system for diverting and filtering a portion of the normal oil flow of an engine comprising a secondary filter unit having an inlet for receiving the diverted portion of the oil flow and an outlet for returning filtered oil to the engine. The outlet is connected to an existing access to the engine crankcase, such as the oil dipstick tube or the oil inlet for adding oil to the engine.

6 Claims, 6 Drawing Figures

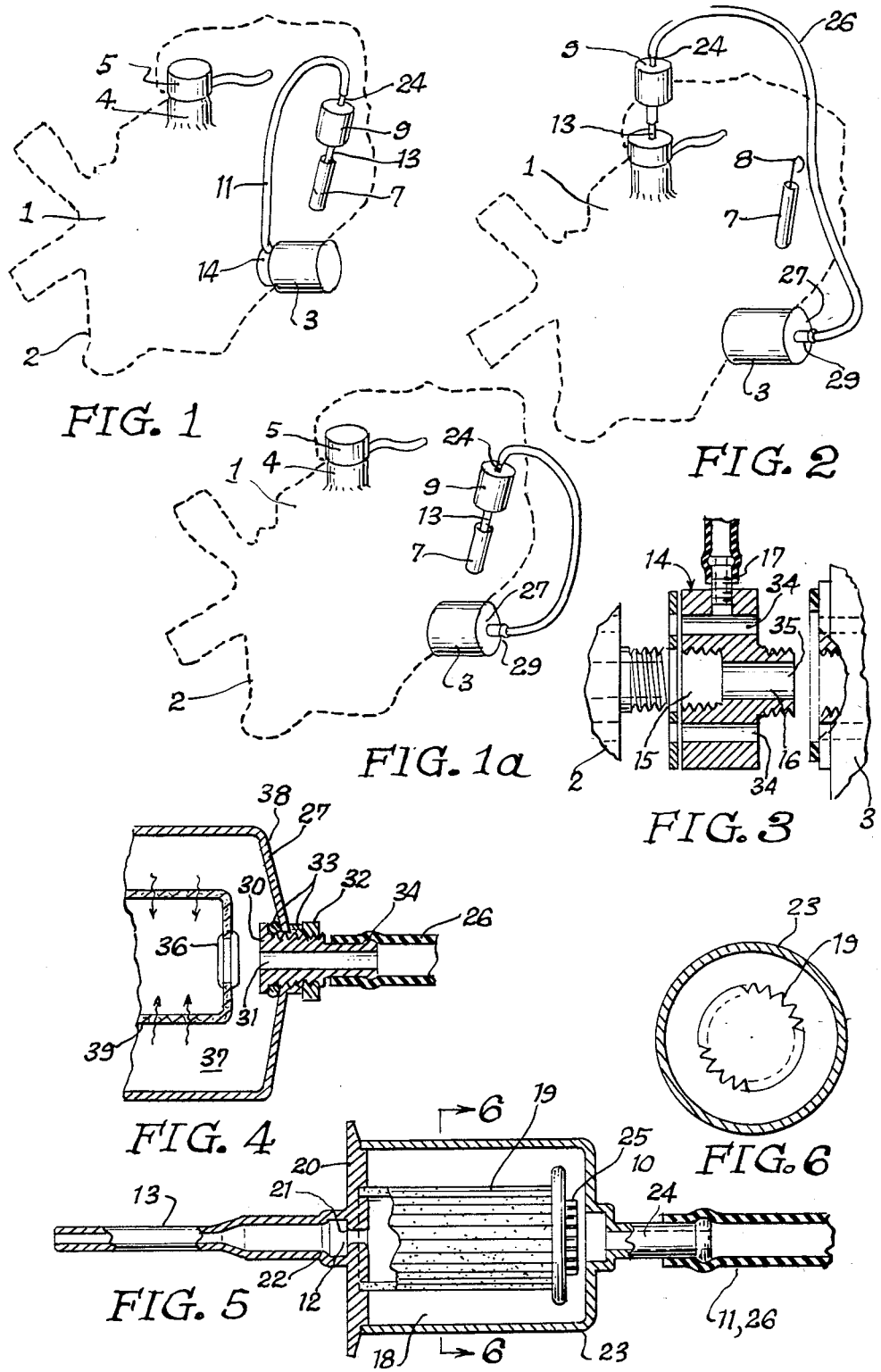

AUXILIARY OIL FILTRATION SYSTEM

BACKGROUND OF THE INVENTION

The present invention relates to an auxiliary oil filter system for automobile engines.

The primary oil filter of most automobile engines, commonly referred to as a spin-on filter, filters the entire normal oil flow and is commonly situated between the oil pump and the engine's moving parts. It is normally mounted on the engine crankcase. This filter must be relatively porous in order to maintain a certain degree of oil pressure throughout the engine. Most models are provided with a safety valve which opens when the filter becomes clogged in order to keep the oil (all be it unfiltered) flowing through the engine. A finer porosity auxiliary or secondary oil filter system is sometimes provided to divert a portion of the normal oil flow and filter that portion beyond the level of filtration achieved by the primary oil filter. Such systems normally comprise an auxiliary oil filter mounted on a bracket external to the engine crankcase and connected to the crankcase via a flexible hose. The connection involves drilling a hole through the crankcase, thus increasing the risk of oil leakage.

Auxiliary oil filters are commonly of the canister type with replaceable filter elements. The filter elements are often of the toilet paper roll type and are messy and inconvenient to replace. It is also difficult to tell when the filter elements of such filters need replacing, a condition which tends to diminish the efficiency of such devices since they can become unsuspectedly clogged and remain so until the next maintenance service.

SUMMARY OF THE INVENTION

It is an object of the present invention to provide an auxiliary oil filter system for an engine which is relatively easy to mount and to replace when clogged.

An auxiliary oil filter system for filtering a diverted portion of the normal oil flow of an engine is provided according to the invention. The system comprises a secondary filter unit, with a finer gauge than the primary filter, having an inlet and an outlet, an inlet connector for diverting a portion of the normal oil flow of the engine to the inlet, and an outlet connector for connecting the filter unit outlet to an existing access to the engine crankcase. The existing oil system access may comprise either the dipstick tube through which a dipstick for measuring oil level normally extends, or the oil inlet cap which allows oil to be added to the engine The filter unit is a replaceable unit, and is simply disconnected and replaced with an entirely new unit when necessary. This is considerably less messy than replacing only the filter element.

The filter unit is mounted either into the standard oil dipstick tube or on the oil inlet cap for return of the diverted oil to the engine. Thus there is no need to drill any extra holes in the engine crankcase, and there will be less risk of oil leaks. There is also no need to provide a bracket for mounting the auxiliary filter, since it is mounted either on the dipstick tube or on the oil inlet cap.

Being of a finer gauge, the secondary filter is more likely to clog than the primary one. As time passes it will be filtering finer ad finer particles; thus increasing its qualitative efficiency while reducing the volume of processed oil during a given period of time.

Preferably, the filter unit comprises an external transparent housing through which the clogging level of the filter can be readily ascertained with a filter element mounted within the housing. The filter element is preferably of the multi-pointed star type. A magnet may be mounted at one end of the filter element to attract metallic particles in the oil and provide better filtration.

The outlet connector preferably comprises a tube projecting outwardly from the filter unit outlet which can be mounted concentrically within the oil dipstick tube or project through the oil inlet cap for returning filtered oil to the engine.

BRIEF DESCRIPTION OF THE DRAWINGS

FIG. 1 shows a first embodiment of an auxiliary oil filter system according to the invention;

FIG. 2 shows a second embodiment of an auxiliary oil filter system according to the invention;

FIG. 3 is a vertical cross-section through an adapter for diverting a portion of the main oil flow of the engine through the auxiliary filter system of FIG. 1;

FIG. 4 is a vertical cross-section through a connector device used in the system of FIG. 2;

FIG. 5 is a vertical cross-section through the auxiliary oil filter unit of the systems shown in FIGS. 1 and 2; and FIG. 6 is a section along the lines 6—6 of FIG. 5.

DESCRIPTION OF THE PREFERRED EMBODIMENTS

FIGS. 1 and 2 show two alternative secondary oil filter systems for diverting and filtering a portion of the normal oil flow through an engine 1. In each case the system is shown connected externally of an engine crankcase 2 having a primary oil filter 3 connected to it for filtering oil in the normal flow path and having two inlets connected to the engine oil system. One inlet 4 is closed by the normal oil inlet cap 5 and is used to refill oil when the oil level is low. The other inlet 6 comprises the normal oil dipstick tube 7 into which a dipstick 8 (see FIG. 2) normally projects to measure the oil level.

In the system of FIG. 1 an secondary oil filter unit 9 has an inlet 10 connected via a flexible hose 11 to the primary oil filter 3 and an outlet 12 connected via connector tube 13 to the oil dipstick tube 7. Thus diverted oil is returned through the secondary filter unit to the engine through the dipstick tube 7.

FIG. 3 shows an adapter 14 for connecting the hose 11 to the primary oil filter 3. The adapter 14 comprises a connector tube with screw threaded ends 15, 16 for connection to the engine crankcase 2 and the base of the primary oil filter 3, respectively. The oil flows through the peripheral bores 34 of the adapter into the primary oil filter 3 and return to the crankcase through the central bore 35. A transverse outlet 17 from the connector tube is connected to the end of the hose 11 and diverts a portion of the oil flowing through one of the peripheral bores 34 of the adapter to the secondary filter unit.

The secondary filter unit 9 is shown in more detail in FIGS. 5 and 6. The unit 9 comprises a generally cylindrical housing 18 and a filter element 19 mounted in the housing. The oil inlet and outlet 10, 12 are located in opposite ends of the housing. The outlet end of the housing comprises a base member 20 having a central opening 21 defining the outlet and connector tube 13 projecting outwardly from the opening 21. The tube 13 is of stepped diameter and is adapted to project into a standard oil dipstick tube 7 when the system is in use.

The stepped diameter of the tube allows the system to be installed on engines having dipstick tubes with different cross-diameter. A shoulder 22 on the tube 13 will normally rest on the upper end of the dipstick tube. The base member 20 and tube 13 are suitably of metallic material such as aluminum or plastic. The hose 11 may have fins along its entire length for maximum deflection of heat from the oil flowing through the secondary oil filter as a result of the air flow from the engine across the fins.

The remainder of the housing comprises a cylindrical case 23 which is preferably of transparent material at least in its cylindrical part and which is mounted in the base member 20. An inlet tube 24 for connection to the end of the hose 11 projects from the inlet opening provided in the upper end of the case 23.

The filter element 19 in the preferred embodiment is a star-shaped membrane of folded paper secured at one end to the base member 20. The element 19 may be secured to the base member with a suitable adhesive or a retaining spring may be provided to urge the filter element 19 against the base member. A magnet 25 is secured to the free end of the filter element to catch minute metallic particles carried in the oil and caused by engine wear.

The auxiliary filter unit 9 is a completely sealed unit designed to be removed and replaced by a new unit when necessary. The unit is replaced by simply taking it out of the dipstick tube and disconnecting the other end from the hose 11. Thus it is quick and easy to replace, and replacement is much less messy than for filters where only the filter element is replaced. Since the case 23 is transparent it is easy to see when the unit is becoming clogged and needs replacing. This feature maximizes the utility of the device, since it is more likely to be replaced when clogged than an opaque unit which could become clogged unsuspectedly and remain so until the next maintenance service.

The magnet 25 will attract metallic particles in the oil flowing through the filter unit 9 to the filter element and will thus increase the efficiency of the filter unit.

In the system of this embodiment a portion of the engine oil will be diverted through the secondary oil filter unit and then return to the engine via the oil dipstick tube. The diverted oil will be more thoroughly filtered. Over an operating period of time all of the oil in the engine will pass through the secondary filter unit. Thus the oil will stay cleaner using this system than if only the primary oil filter were used, reducing the frequency of oil changes and thus saving oil and fuel.

The system of FIG. 2 uses substantially the same secondary oil filter unit 9 as is used in FIG. 1, and like reference numerals have been used where appropriate. However in this system the unit 9 is mounted on the oil inlet cap 5. As shown in FIG. 2, the inlet tube 24 of filter unit 9 is connected via flexible hose 26 to the base 27 of the primary oil filter 3. The filter unit outlet connector tube 13 is connected through an opening 28 in the oil inlet cap 5 to the main oil system of the engine.

FIG. 4 shows a connector device 29 used to connect the end of the hose 26 to the top 27 of the primary oil filter above the safety valve 36. A hole is drilled through the top 27, and a headed plug 30 forming a part of the device projects through the hole and into the pressurized chamber 37 between the filter walls 38 and the filtering element 39. Plug 30 has a through bore 31 and external screw threads on which a unit 32 engages to hold the plug in place. Suitable seal washers 33 are provided between the nut, the base of the primary oil filter, and the head of the plug 30. The free end 34 of the plug 30 is of increased diameter to retain the flexible hose 26 as shown.

The secondary filter unit 9 may be connected to the oil inlet cap 5 in a similar fashion, or the outlet tube 22 may simply project through the opening 28 in the cap 5.

In both the systems of FIG. 1 and FIG. 2, a connector device as shown in FIG. 4 may alternatively be used to connect the end of the hose 11 or 26 to the top of the secondary filter unit 9, the plug 30 replacing inlet tube 24.

In the embodiment of FIG. 2 a portion of the oil flowing through the primary filter 3 will pass out through the hole in the filter top 27 and into the hose 26. The diverted oil will then flow through the secondary filter unit to be further filtered and then delivered back to the engine through the oil inlet cap. Over a period of time all of the oil in the engine will pass through the secondary filter unit and thus the oil will stay sufficiently clean for longer periods of time.

In both the system of FIG. 1 and the system of FIG. 2, the secondary filter unit is connected to an existing oil inlet on the engine crankcase, and thus no extra bores have to be drilled in the crankcase. The unit 9 is simply insertd either in the oil dipstick tube or through the oil filter cap and thus needs no special mounting bracket. It is easily accessible, and is a completely replaceable unit which is easily lifted out of the dipstick tube or oil filter cap and pulled off the end of the hose 11 or 26 whenever a new unit is needed. This is less messy than for filter units where only the filter element is replaced. The transparent case allows the operator to see when the filter unit is becoming clogged and needs replacing. The qualitative efficiency of the filter improves with partial clogging. The device should not be replaced until the clogging has become so severe that no significant amount of oil is allowed to flow through it.

In both systems the oil in the engine will remain clean for longer than if only the primary filter unit were used, resulting in less frequent oil changes, savings in oil and fuel and reduced engine wear over a period of time the slow increase in the clogging of the secondary filter an be easily monitored through the transparent housing. Oil which tends to accumulate into the housing during operation will slowly seep through the filter and leak to the crankcase over a period of non-operation such as during the night. A quick look under the hood before starting the car in the morning will readily reveal a clogged condition if oil still remains in the housing after the over-night period of idleness, requiring a replacement of the secondary filter.

While the invention has been particularly shown and described with reference to the preferred embodiments, it will be understood that modifications can be made to the disclosed embodiments without departing from the scope of the invention, which is defined in the appended claims.

What is claimed is:

1. An auxiliary filter system for diverting and filtering a portion of the normal oil flow of an engine having an oil dipstick tube for checking the engine oil level, the auxiliary filter system comprising:

an secondary filter unit having an oil inlet and an oil outlet, said secondary filter unit comprising a housing and a filter element mounted in said housing, said housing being formed at least partially of transparent material such the the interior of said housing is visible;

means for diverting a portion of the normal oil flow of the engine to the filter unit inlet; and means for connecting said filter unit outlet in an upright orientation to said oil dipstick tube, said connecting means comprising a tube projecting from said unit outlet for insertion into said oil dipstick tube.

2. The system of claim 1, wherein magnetic means are secured to said filter element for attracting metallic particles to said element.

3. The system of claim 2, wherein said housing has a base having an opening defining said outlet, said tube projecting outwardly from said outlet, and a cylindrical case of at least partially transparent material mounted in said base, the free end of said case having an opening defining said inlet, and said filter element being mounted in said base within said case.

4. The system of claim 1, wherein said secondary filter unit is a sealed, replaceable unit.

5. The system of claim 3 wherein the oil flows first in the peripheral area of the secondary filter visible through said transparent case before flowing through said filter element.

6. An engine oil system defining a primary oil flow path and a by-pass oil flow path in an engine having an oil dipstick tube, the system including:
(a) a primary oil filter in the primary oil flow path for filtering all the oil in the system;
(b) means for diverting a portion of the oil from the primary oil filter into said by-pass oil flow path;
(c) secondary filter means in said by-pass oil flow path for filtering said diverted portion, said secondary filter means comprising a filter unit having an oil inlet for connection to said primary oil filter and an oil outlet for insertion in said oil dipstick tube, said oil outlet comprising means for mounting said filter unit in an upright position on said oil dipstick tube.

* * * * *